United States Patent
Ashton et al.

(10) Patent No.: US 6,678,752 B1
(45) Date of Patent: Jan. 13, 2004

(54) DATA STORAGE SYSTEM WITH AUTOMATIC STORAGE REQUEST ANALYSIS AND SELECTION OF OPTIMAL OUTPUT MEDIA TYPE

(75) Inventors: Lyn Lequam Ashton, Tucson, AZ (US); Cuong Minh Le, Tucson, AZ (US); Jerry Wayne Pence, Tucson, AZ (US); James Mitchell Ratliff, Benson, AZ (US); Glenn Randle Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 09/672,526

(22) Filed: Sep. 28, 2000

(51) Int. Cl.[7] .................................................. G06F 3/00
(52) U.S. Cl. ............................. 710/15; 710/16; 710/17; 710/18; 710/19; 710/33; 710/40; 709/225; 709/229
(58) Field of Search ............................... 710/15–19, 33, 710/40; 709/225, 229

(56) References Cited

U.S. PATENT DOCUMENTS

| | | | |
|---|---|---|---|
| 3,623,006 A | * 11/1971 | Balakian et al. ............ 711/111 |
| 4,310,883 A | 1/1982 | Clifton et al. ............... 364/200 |
| 4,638,424 A | 1/1987 | Beglin et al. ................ 364/200 |
| 4,771,375 A | 9/1988 | Beglin et al. ................ 364/200 |
| 5,131,087 A | 7/1992 | Warr ........................... 395/425 |
| 5,161,214 A | 11/1992 | Addink et al. ............... 395/145 |
| 5,506,986 A | 4/1996 | Healy .......................... 395/600 |
| 5,661,848 A | * 8/1997 | Bonke et al. ................ 711/112 |
| 5,778,165 A | 7/1998 | Saxon ................... 395/182.02 |
| 5,794,244 A | * 8/1998 | Brosch et al. .............. 707/100 |
| 5,960,423 A | 9/1999 | Chaudhuri et al. ............ 707/2 |
| 6,446,160 B1 | * 9/2002 | Le et al. ..................... 711/112 |

* cited by examiner

*Primary Examiner*—Jeffrey Gaffin
*Assistant Examiner*—Eron Sorrell
(74) *Attorney, Agent, or Firm*—Dan Hubert

(57) ABSTRACT

In a data storage system with multiple output media types, each request to store a data object is automatically analyzed to select the optimal output media type. In choosing the output media type best suited to quickly and efficiently complete the storage requests, the storage system considers (1) attributes of the data object itself, such as its size, (2) any perceived urgency required to complete the data storage request, and (3) attributes of the system's storage devices, such as the availability of different output media types, presence of other storage requests queued for storage for each type, level of ongoing access of each storage type by concurrent storage tasks, delays to initiate storage such as mount/demount times, amount of storage space available in different output media types, and the like.

21 Claims, 3 Drawing Sheets

DATA STORAGE SYSTEM WITH AUTOMATIC STORAGE REQUEST ANALYSIS AND SELECTION OF OPTIMAL OUTPUT MEDIA TYPE

BACKGROUND OF THE INVENTION

1. Field of the Invention

The present invention relates to data storage systems with capability to store data upon different types of storage media, such as disk drive storage, magnetic tape storage, and other varieties. More particularly, the data storage system of this invention responds to data storage requests by automatically analyzing the data to be stored, and then selecting the optimal type of output media according to factors such as the data size, the type of output media installed in the system, the availability of different output media types, and the urgency of the storage request.

2. Description of the Related Art

With the increasing importance of electronic information today, there is a similar increase in the importance of reliable data storage. The market abounds with different means of data storage today, ranging from minuscule integrated circuits to giant tape storage facilities that can occupy an entire room. Many data storage systems utilize several different types of storage in order to reap the particular benefit of each different type of storage. In implementation, data storage is often separated into several different levels, each level exhibiting a different data access time or data storage cost.

A first, or highest level of data storage involves electronic memory, usually dynamic or static random access memory (DRAM or SRAM). Electronic memories take the form of semiconductor integrated circuits where millions of bytes of data can be stored on each circuit, with access to such bytes of data measured in nanoseconds. The electronic memory provides the fastest access to data since access is entirely electronic.

A second level of data storage usually involves direct access storage devices (DASD). DASD storage, for example, includes magnetic and/or optical disks. Data bits are stored as micrometer-sized magnetically or optically altered spots on a disk surface, representing the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA) typically includes one or more read/write heads, and is provided in each DASD for moving across the tracks to transfer the data to and from the surface of the disks as the disks are rotated past the read/write heads. DASDs can store Gigabytes of data, and the access to such data is typically measured in milliseconds (orders of magnitudes slower than electronic memory). Access to data stored on DASD is slower than electronic memory due to the need to physically position the disk and HDA to the desired data storage location.

A third or lower level of data storage includes tapes, tape libraries, and optical disk libraries. Access to library data is much slower than electronic or DASD storage because a robot is necessary to select and load the needed data storage medium. Also, in the case of tape storage, access may be slowed by the need to serially position the tape media. An advantage of these storage systems is the reduced cost for very large data storage capabilities, on the order of Terabytes of data. Tape storage is often used for backup purposes. That is, data stored at the higher levels of data storage hierarchy is reproduced for safe keeping on magnetic tape. Access to data stored on tape and/or in a library is presently on the order of seconds.

As mentioned above, many data storage systems incorporate numerous output media types in order to reap the distinct benefits of each type. With so many different output media types in one system, however, it can be challenging to choose the appropriate media type for each particular storage operation.

One known approach accumulates all data sets in DASD storage, and later during a defined window, moves data sets to tape. While this approach offers the advantage of moving all the data congruently together, it also requires data to be moved twice, first onto DASD and later onto tape. Also, this approach does not take advantage of tape's typically faster throughput for the original storage operation, and does not consider the possibility that larger data sets may not be stored at all if DASD does not have enough remaining free space. Another design option is to default to using a certain media type, but allow other types to be specified by command. The disadvantage of using this technique is that it relies on end users to decide where to route storage requests, regardless of whether such users are qualified to make such technical decisions. And, depending upon the number and arrival rate of data storage requests, it may be difficult or even impossible for a human operator to select the appropriate output media type for each storage request. Moreover, using a human operator to choose the output media type for each storage request incurs labor costs and also delays the speed of data storage.

Consequently, numerous challenges face those attempting to satisfy data storage requests in storage systems with multiple output media types.

SUMMARY OF THE INVENTION

Broadly, the present invention concerns a data storage system with multiple output media types, where requests to store data objects are automatically analyzed to aid in selecting the optimal output media types. In choosing the output media type best suited to quickly and efficiently complete each storage request, the storage system considers (1) attributes of the data object itself, such as its size, (2) any perceived urgency required to complete the storage request, and (3) attributes and conditions of the system's storage devices, such as the availability of different output media types, presence of other storage requests queued for storage for each type, level of ongoing access of each storage type by concurrent storage tasks, delays to initiate storage such as mount/demount times, amount of storage space in different output media types, and the like.

In one particular implementation of this approach, the system utilizes tape and DASD as the output media types. A storage manager component of the system runs a storage analysis/management program, which analyzes each request to store a data object. Depending upon the system's configuration, storage requests may arise from customer applications, or from internal processes such as migration of data from one storage site to another. If the data storage request is not urgent, the storage manager opts to use tape. For urgent storage requests, the storage manager tempers its choice according to the data object's size. For large data objects, the storage manager chooses tape. For small data objects, the storage manager uses DASD unless either of the following special conditions applies, in which case the storage manager utilizes tape: (1) one of the tape drives contains a mounted, non-busy tape that is already allocated to serve the storage analysis/management program, and no large or medium-sized data objects await storage, or (2) the DASD is already being accessed by its maximum number of concurrent tasks, there is a non-busy tape drive accessible to the storage analysis/management program, and a tape is ready to conduct input/output (I/O) before the DASD. The relative readiness of tape and DASD to conduct I/O may be considered predictively (by estimation), or in real time (by waiting to see which media is ready first). For medium-sized data objects, the storage manager chooses tape unless the following special conditions apply, in which case the storage manager uses DASD: (1) all tape drives accessible to the storage analysis/management program are busy, or (2) the DASD is being accessed by less than its maximum number of concurrent tasks, and there are no small-sized data objects queued for storage.

The foregoing features may be implemented in a number of different forms. For example, the invention may be implemented to provide a method of analyzing requests to store data objects to select the optimal output media type. In another embodiment, the invention may be implemented to provide an apparatus such as a data storage system configured as described herein to analyze requests to store data objects in order to select the optimal output media type. In still another embodiment, the invention may be implemented to provide a signal-bearing medium tangibly embodying a program of machine-readable instructions executable by a digital data processing apparatus to analyze requests to store data objects in order to select the optimal output media type. Another embodiment concerns logic circuitry having multiple interconnected electrically conductive elements configured to analyze requests to store data objects in order to select the optimal output media type.

The invention affords its users with a number of distinct advantages. Importantly, the invention completes data storage requests as quickly as possible by selecting the optimal output media type. Data storage requests complete more quickly because, as analyzed by the invention, the selected media type has earlier readiness, greater size, or other beneficial properties to efficiently satisfy the data storage request. Also, the pre-storage analysis of this invention reduces the likelihood of data storage requests ultimately failing due to lack of free space in a particular output media type, or for other such reasons. As another advantage, the invention can quickly select the output media type for each data storage request because the invention utilizes computer-driven machinery instead of requiring a human operator to manually make such decisions. And, for this same reason, the invention can consider a greater number and complexity of factors in selecting the optimal type of output media, with less likelihood of error. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Introduction

Figure 1:
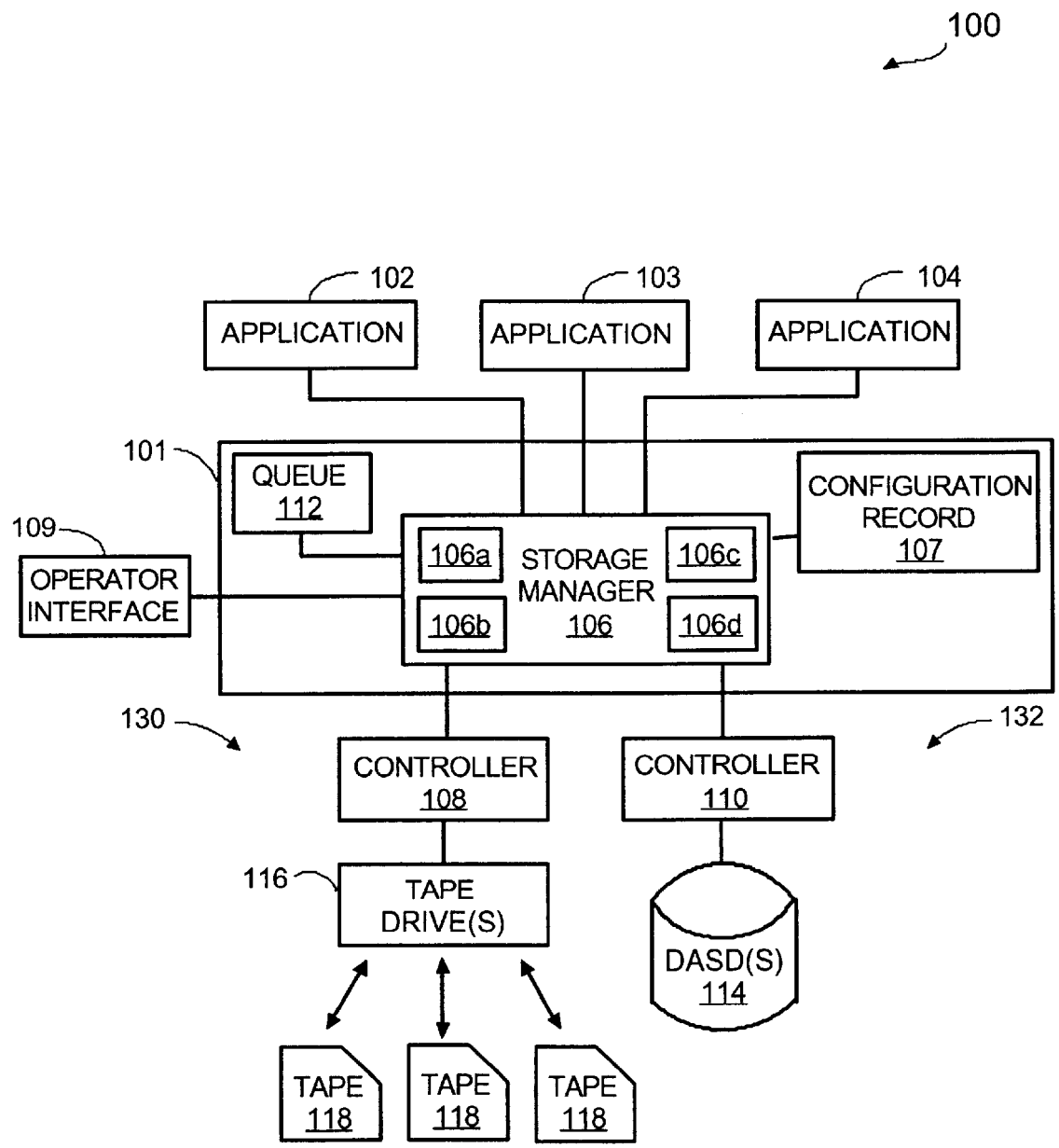
FIG. 1 is a block diagram of the hardware components and interconnections of a data storage system according to the invention.

One aspect of the invention concerns a data storage system, which may be embodied by various hardware components and interconnections, with one example being described by the system 100 of FIG. 1. The system 100 includes a subsystem facility 101 coupled to one or more applications 102–104, an operator interface 109, and various data storage facilities. The data storage facilities include first 130 and second 132 types of storage. In the present example, the first storage type constitutes removable magnetic tape cartridges 118, and the second type storage constitutes DASD 114.

Applications

Three applications 102–104 are illustrated, although a greater or lesser number may be used. The applications 102–104 comprise application software programs, computer workstations, servers, personal computers, mainframe computers, manually activated operator terminals, and the like. The applications 102–104 represent application programs that utilize the subsystem facility 101 to store and retrieve data using data storage managed by the subsystem facility 101. Namely, the applications 102–104 request the storage manager 106 to store data files, records, blocks, pages, or data items, whereupon the subsystem facility 101 carries out the appropriate data storage operations using the DASD 114 and/or tapes 118 mounted to the tape drives 116. There may also be one or more processes 106a–106d internal to the subsystem facility 101 that utilize tape 118 and DASD 114 storage. One example is a hierarchical storage manager that initially stores customer data in cache storage (not shown) of the subsystem facility 101, and selectively migrates data to tape 118 and DASD 114 storage according to a criteria such as lack of recent or frequent use.

Operator Interface

The operator interface 109 enables a system administrator or other human operator to communicate with the storage manager 106. Although ordinarily skilled artisans will recognize varied implementations of the operator interface 109, some examples include components such as a cathode ray tube (CRT) monitor, liquid crystal display (LCD) flat panel display, keyboard, computer mouse, mechanical devices (such as buttons, dials, switches, etc.), voice recognition devices, audio speakers, eye-operated pointing devices, etc.

Data Storage Facilities

As mentioned above, the system 100 includes storage facilities of multiple output media types. These are exemplified by the first 130 and second 132 output media types, although a greater number of output media types may be used. Output media "types" may be used to identify storage devices with different storage speed, device characteristics, size, storage media, model numbers, or any other distinguishing properties. In the illustrated example, the first type 130 includes tape drives 116 configured to conduct read/write operations with removably attachable tapes 118, which may be housed in tape cartridges. As one example, the drives 116 may comprise magnetic tape drives such as IBM model 3590-E1A tape drives, and they may reside in automated tape libraries. Although magnetic tape storage is used to illustrate the invention (with no intended limitation), the drives 116 may also be implemented by a variety of alternative storage media.

As illustrated, the second output media type 132 comprises a DASD 114 which comprises one or more DASD devices, such as the magnetic disk drive storage type. One example of such disk drive storage is an IBM model 3390 product. The DASD 114 may contain one, several, or many head disk assemblies (HDAs).

The system 100 also includes controllers 108, 110. Namely, one or more controllers 108 manage low level operations of the tape drives 116 under direction of the subsystem facility 101. For instance, the controller 108 may direct read/write heads to carry out Read and Write operations upon tapes 118 mounted to the drives 116. The controller 108 may comprise one or more microcontrollers, for example. Similarly, one or more controllers 110 manage operations of the DASD 114 under direction of the subsystem facility 101.

The system 100 may also include automated mount/demount equipment (not shown). This equipment serves to mount and demount tapes to/from the drives 116. In one example, such equipment may be provided by separate cartridge loaders or other equipment local to each drive. In another example, the mount/demount equipment may be provided by a robotic arm or other component with universal access to all drives 116. In still another alterative, a human operator may be employed to carry out tape mount/demount operations.

Subsystem Facility

As mentioned above, the subsystem facility 101 manages access to the first and second output media types 130, 132 to satisfy storage needs of the applications 102–104 as well as internal processes 106a–106d of the subsystem facility 101. The subsystem facility 101 includes a storage manager 106, queue 112, and configuration record 107.

The storage manager 106 comprises electronic circuitry capable of managing operations of the output media types 130, 132. As illustrated, the storage manager 106 includes a number of processes 106a–106d that may comprise process threads, subroutines, concurrent tasks, or other processes internal to the storage manager 106. One of these internal processes is a storage analysis/management program that selects the optimal output media type according to the present invention. The storage manager 106 may be implemented by a variety of different hardware devices, such as a personal computer, server, computer workstation, mainframe computer, etc. The storage manager 106 may share common hardware with one or more of the applications 102–104. In one particular example, the storage manager 106 may be implemented by an IBM brand S/390 machine running commercially available software such as the IBM brand Data Facility Storage Management Subsystem Hierachical Storage Manager ("DFSMShsm") product.

The queue 112 contains storage requests from the applications 102–104 and processes 106a–106d that have been received by the storage manager 106. These storage requests seek to store data in the storage facilities managed by the subsystem facility 101. The queue 112 may be implemented by a register, table, memory, data set, file, or other data structure, whether implemented in hardware, software, or both.

The configuration record 107 contains various operating parameters related to the storage manager's use of the output media types 130, 132. For example, the configuration record 107 contains definitions of "large," "medium," and "small" data object sizes. The configuration record 107 may be implemented by a register, table, memory, data set, file, or other data structure, whether implemented in hardware, software, or both. Advantageously, contents of the configuration record 107 may be set during an initialization operation during installation or configuration of the subsystem facility 101, and/or subsequently reconfigured during system operation ("on the fly") pursuant to operator input received via the interface 109.

Exemplary Digital Data Processing Apparatus

Figure 2:
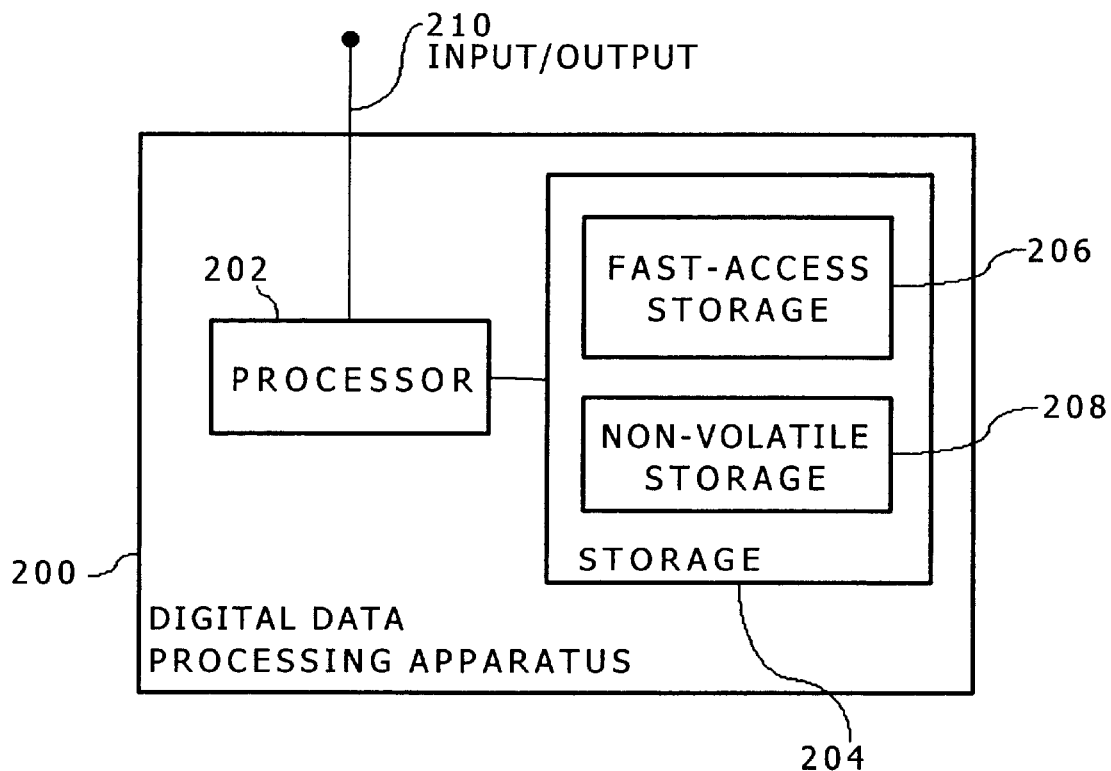
FIG. 2 is a block diagram of a digital data processing machine according to the invention.

As mentioned above, the storage manager 106 may be implemented in various forms. As one example, the storage manager 106 may comprise a digital data processing apparatus, as exemplified by the hardware components and interconnections of the digital data processing apparatus 200 of FIG. 2.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the storage manager 106. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the method aspect of the present invention will now be described. This method involves the operation of a data storage system with multiple output media types, where each request to store a data object is automatically analyzed to select the optimal output media type. Although the present invention has broad applicability to management of storage systems with different types of output media, the specifics of the structure that has been described is particularly suited for tape and DASD storage types, and the explanation that follows will emphasize such an implementation of the invention without any intended limitation.

Signal-Bearing Media

In the context of FIG. 1, such a method may be implemented, for example, by operating the storage manager 106, as embodied by a digital data processing apparatus 200, to execute a sequence of machine-readable instructions. These instructions may reside in various types of signal-bearing media. In this respect, one aspect of the present invention concerns signal-bearing media tangibly embodying a program of machine-readable instructions executable by a digital data processor to automatically analyze requests to store data objects in order to choose the optimal output media type for each storage request.

Figure 3:
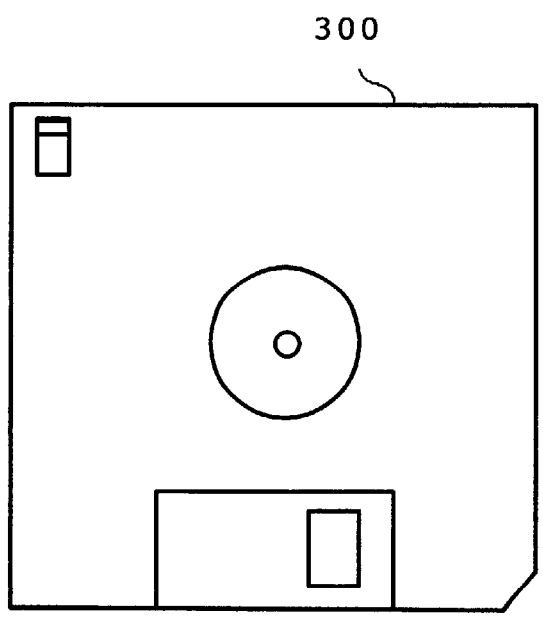
FIG. 3 shows an exemplary signal-bearing medium according to the invention.

This signal-bearing media may comprise, for example, RAM (not shown) contained within the storage manager 106, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive," redundant array of inexpensive disks ("RAID"), or other DASD type devices, magnetic tape, electronic read-only memory (e.g., ROM, EPROM, or EEPROM), optical storage (e.g., CD-ROM, WORM, DVD, digital optical tape), paper "punch" cards, or other suitable signal-bearing media including digital or analog transmission media and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the storage manager 106, and is configured to perform operations to implement the method of the invention. The logic circuitry may be implemented using many different types of circuitry, as discussed above.

Storage Analysis/Management Sequence

Introduction

Figure 4:
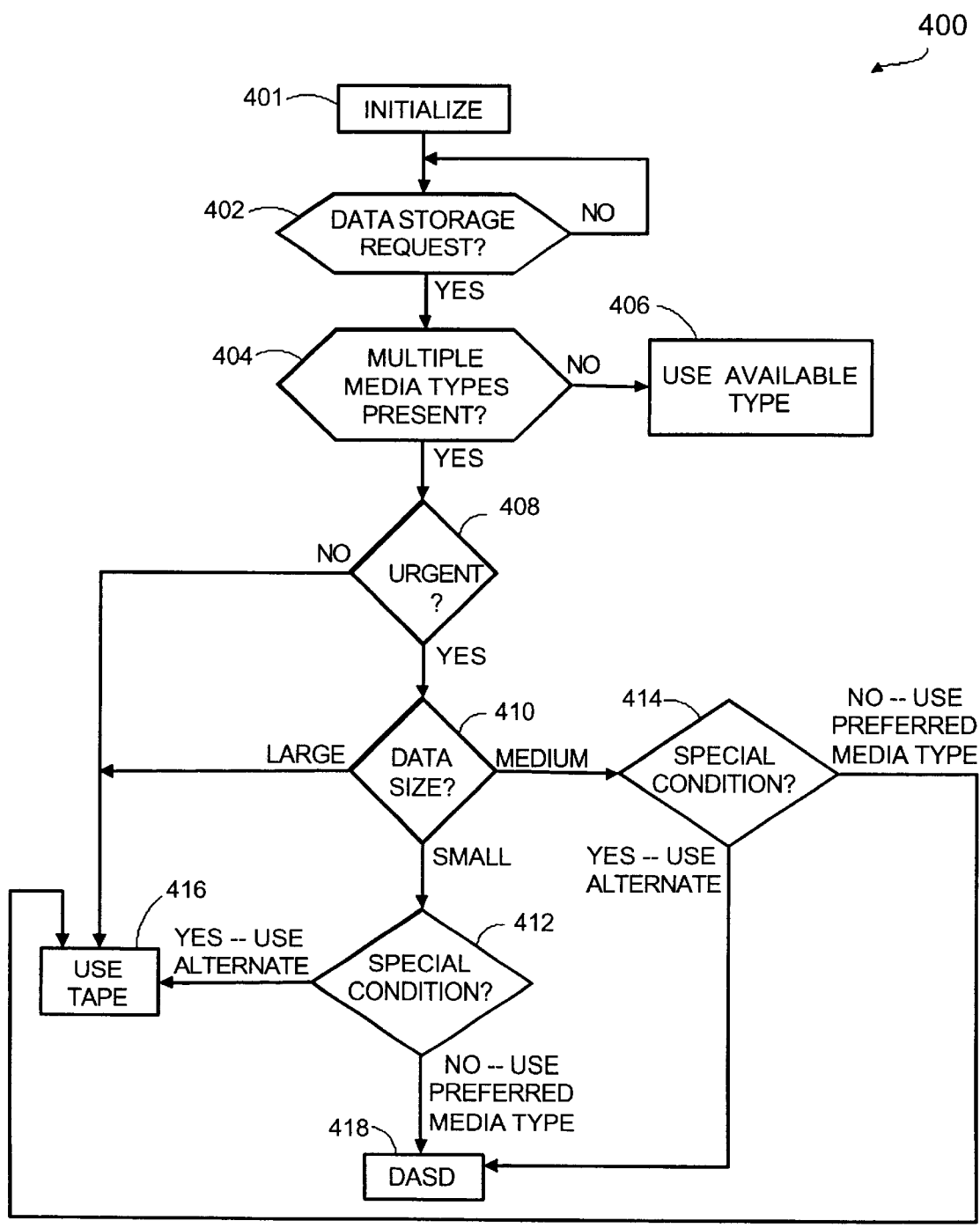
FIG. 4 is a flowchart showing a process for analyzing data storage requests and selecting the optimal output media type according to the invention.

FIG. 4 shows a sequence 400 to illustrate one example of the method aspect of the present invention. For ease of explanation, but without any intended limitation, the example of FIG. 4 is described in the context of the data storage system 100 described above. Broadly, the sequence 400 responds to data storage requests from the applications 102–104 and/or processes 106a–106d by automatically analyzing the data to be stored, and then selecting the optimal output media type according to various considerations. The sequence 400 is performed by the storage manager 106, and may be referred to as a storage management/analysis program.

Initialization

The sequence 400 begins in step 401, where the storage manager 106 receives initialization information regarding the treatment of incoming data storage requests. In one example, initialization occurs during installation or configuration of the subsystem facility 101, and involves a human operator providing various operating parameters to the storage manager 106 via the interface 109. The storage manager 106 stores these operating parameters in the configuration record 107. Advantageously, the storage manager 106 is programmed such that the initialization of step 401 may be repeated in order to update, delete, or otherwise change any of the initialized parameters. As an additional, or alternative feature, the operating parameters of the storage manager 106 may be reinitialized "on the fly" after step 401 by updating contents of the configuration record 107. Changing the operating parameters "on the fly" may be achieved by operator input via the interface 109, in one example. In another example, the storage manager 106 may automatically update the operating parameters in response to certain stimuli, such as addition or removal of storage components, empirical analysis of past storage events, etc.

The operating parameters that are initialized in step 401 include specification of different predetermined sizes of data objects. Although the number of different sizes and value of each size may be varied according to the characteristics of the storage types 130, 132 in the system 100, the following provides one example:

LARGE—data objects exceeding 3 Megabytes (Mb). As mentioned below, data objects larger than this will be stored on tape.

MEDIUM—data objects between 250 Kb and 3 Mb. Data objects in this range will prefer tape, unless certain "special conditions" apply.

SMALL—data objects less than 250 Kb. Data objects in this range will prefer DASD, unless certain special conditions apply.

The application of these size ranges is discussed in greater detail below. In addition to the size ranges, other operating parameters may also be initialized in step 401. For example, step 401 initialization may define "presence" of an output media type in the system 100 (discussed below in step 404), "urgency" of data storage requests (discussed below in step 408), as well as various other parameters. Optionally, step 401 may also define a subset of the "present" tape drives that are "accessible" to the program 400.

In establishing the operating parameters of step 401, the operator should consider the characteristics of the particular output media types present in the system 100. Namely, the operating parameters should be established in a manner that will cause the storage manager 106 to select the optimal output media type from among the particular storage types 130, 132 implemented in the system 100. In the present example, where the output media types include tape 118 and DASD 114, the operator's initialization of the operating parameters must consider the operating and storage characteristics of the particular tape drives 116, tapes 118, and DASD 114. In the illustrated example, some characteristics that are relevant in initializing the system 100 appear in TABLE 1, below.

TABLE 1

CHARACTERISTICS OF OUTPUT MEDIA TYPES IMPLEMENTED IN THE SYSTEM 100

| | OUTPUT MEDIA TYPE | |
|---|---|---|
| CHARACTERISTIC | TAPE 118 | DASD 114 |
| ALLOCATION TIME | THE TIME IT TAKES TO ALLOCATE A TAPE DRIVE AND MOUNT A TAPE | NEGLIGIBLE |
| DATA THROUGHPUT | FASTER THAN DASD 114 IN THIS EXAMPLE | SLOWER THAN TAPE 118 IN THIS EXAMPLE |
| NUMBER OF TIMES DATA IS MOVED, SINCE TAPE WILL BE THE FINAL DESTINATION FOR LONG TERM STORAGE | ONCE | TWICE |
| COST PER MEGABYTE | LESS THAN DASD 114 | MORE THAN TAPE 118 |
| LARGEST ALLOWABLE DATA OBJECT SIZE | NO LIMIT | DEPENDS ON FREE SPACE IN DASD |

Data Storage Request

After the initialization of step 401, the storage manager 106 waits to receive a data storage request (step 402). Data storage requests are received from the applications 102–104 and/or processes 106a–106d, which are collectively referred to as "tasks." A data storage request specifies storage of a "data object," which may comprise one or more files, data sets, records, sectors, pages, bytes, bits, volumes, cylinders, or any other physical or logical unit or data structure. Step 402 advances to step 404 when the storage manager receives a data storage request. The data storage request received in step 404 is referred to as the "current" data storage request.

Multiple or Single Output Media Types?

In step 404, the storage manager 106 asks whether multiple output media types are "present" in the system 100. This analysis is useful because if an output media type (such as DASD 114) is not present, there is no need to waste time choosing between DASD and tape output media types. "Presence" of an output media type may be defined according to the needs of the application, this value may be stored in the configuration record 107 during initialization 401 as mentioned above. As one example, an output media type is "present" in the system 100 if the configuration of the subsystem facility 101 includes that output media type, i.e., the corresponding output media device is installed in the system 100. "Presence" may further require that the output media type be working properly. As a different option, a storage administrator may dictate whether an output media type is present or not by manual command or by making an entry in the configuration record 107.

If step 404 finds that only one output media type is present in the system 100, then step 404 advances to step 406. Here, the storage manager 106 utilizes the sole output media type that is present in the system 100. On the other hand, if multiple output media types are present, the storage manager performs a number of operations 404–418 to identify the optimal output media type for the current data storage request.

Urgency

In step 408, the storage manager asks whether the current storage request is urgent. As one example, the definition of "urgency" may be established in initialization step 401, or at a subsequent time by operator input via the interface 109. Different definitions of "urgency" may be utilized, depending upon the application. In one example, a data storage request is urgent if the storage request is "synchronous," meaning that the storage request is a wait type request, i.e., the requesting task is waiting for confirmation that the data has been successfully stored before taking further action. In this same example, data storage requests are not urgent if they are asynchronous, meaning that the requesting tasks are not waiting for confirmation of proper data storage. Alternatively, storage requests may be considered urgent when the request itself specifies urgency, or when the request is accompanied by metadata denoting urgency. In still another example, storage requests are urgent if they are issued by foreground tasks rather than background tasks. In still another embodiment, the storage manager 106 in step 408 may cross-reference a lookup table in the configuration record 107 according to the characteristics of the storage request, the storage-requesting task, or other information to determine whether the properties of the current data storage request qualify as urgent or not. For example, data storage requests originating from one, both, or all of the applications 102–104 may be automatically classified as urgent. As a different option, a storage administrator may dictate whether a storage request is urgent or not by manual command or by making an entry in the configuration record 107.

If the current storage request is not urgent, step 408 proceeds to step 416, where the storage manager 106 selects tape 118 as the output media type to satisfy the current request. Tape media is selected under these circumstances because tape is typically less expensive, and because any required mount/demount time is unimportant since the request is not urgent. In addition to selecting tape as the output media type, the storage manager 106 may also carry out the storage request in step 416, by instructing the controller 108 to store the requested data on tape 118.

If the current storage request is urgent, however, the storage manager 106 conducts additional inquiry before selecting the output media type. This additional inquiry varies depending upon whether the current data object is large, medium, or small. Step 410 examines the data object's size and takes various actions, as explained in greater detail below.

Large Data Objects

For large data objects, step 410 proceeds to step 416, where the storage manager 106 selects tape 118 as the output media type. Tape is the "preferred" output media type. Large data objects are stored on tape because they are likely too large to reside in the DASD 114. In this regard, the "large" criteria (set in step 401, as discussed above) may be advantageously set to coincide with the storage capacity of the DASD 114, or a certain percentage of the DASD's storage capacity. Moreover, the storage manager 106 may dynamically update the configuration record 107 to change the "large" criteria according to the storage space remaining on DASD 114. Establishment of the "large" criteria also considers (1) a desire to avoid filling the DASD 114 at an excessive rate, (2) a recognition that any delay in waiting for tape drive allocation and tape mounting will be offset by all the other advantages of using tape media, and (3) the efficiency to be gained by storing large data objects directly to tape rather than storing them to DASD and later having to migrate them to tape.

Medium Data Objects

For medium-sized data objects, step 410 proceeds to step 414. Broadly, the storage manager 106 prefers to store medium-sized data objects on tape for the same reasons as with large data objects. In some cases, however, storage of medium-sized objects is best served by DASD in order to more promptly complete the storage request. Accordingly, tape is the "preferred" output media type for medium-sized data objects, and DASD is the "alternate" output media type. For medium-sized data objects, then, the storage manager 106 selects tape as the output media type (step 416) unless any one of certain "special conditions" apply (step 414), in which case DASD 114 is used (step 418). In the presently illustrated example, the special conditions are detailed as follows:

Special Condition #1—all tape drives accessible to the storage analysis/management program 400 are busy, that is, conducting Read/Write operations. Depending upon configuration of the system 100, the tape drives "accessible" to the program 400 may include all tape drives 116, or a subset of the tape drives 116 established during initialization 401. In this case, the tape output media type has reached its maximum concurrency level. Therefore, selecting DASD avoids delaying the storage request by having to wait for a tape drive 116 to become non-busy.

Special Condition #2—(1) DASD 114 is not yet reached its maximum concurrency level, that is, the greatest number of storage tasks permitted to concurrently access DASD, and (2) the queue 112 does not contain any data objects of "small" size. In this case, selecting DASD will not delay storage of the current data object (because DASD 114 can promptly begin storage), and selecting DASD will not interfere with storage of small data objects for which DASD 114 is particularly suited (because the queue 112 is empty of "small" data objects).

Whether step 414 leads to step 416 or 418, this next step (416 or 418) may stop after selecting the optimal output media type, in which case another process carries out the storage using the selected output media type. Alternatively, steps 416, 418 may perform additional operations to store the data object, such as issuing storage instructions to the appropriate controller 108, 110, etc.

Small Data Objects

For small data objects, step 410 proceeds to step 412. Broadly, the storage manager 106 prefers to store small data objects in the DASD 114 because the mount/demount overhead required to store data objects on tape is relatively more significant to small data objects. In some cases, however, storage of small objects is still best served by tape. Accordingly, DASD is the preferred output media type for small data objects and tape is the alternate output media type. Thus, for small data objects, the storage manager 106 selects DASD as the output media type (step 418) unless certain special conditions apply (step 412), and in such event the storage manager uses tape (step 416). In the presently illustrated example, these special conditions include any of the following:

Special Condition #3—(1) a tape 118 is already mounted to a drive that is allocated to the program 400, (2) that tape is "idle," that is, not conducting Read/Write operations, and (3) the queue 112 does not contain any data objects of medium or large size. In this case, storage of the small data object is not delayed (because tape is immediately ready to begin I/O, and does not require any allocation or mount/demount overhead). In fact, tape storage of the data object will complete more quickly because tape media are devoted completely to one storage task, rather than being shared by multiple concurrent storage tasks as is the case with DASD. Furthermore, using tape to store small data objects under these circumstances will not delay storage of any large or medium-sized data objects because the queue 112 is empty of such data objects.

Special Condition #4—(1) the DASD 114 has reached its maximum concurrency level, (2) one or more tape drives accessible to the program 400 are idle, and (3) the tape is ready to begin conducting I/O before the DASD 114. The tape's readiness to begin conducting I/O may be evaluated by estimate (prediction), or by real-time (waiting until the tape or DASD actually becomes ready to conduct I/O). In the case of estimating readiness, the storage manager 106 may perform an empirical analysis according to historical times of drive allocation, tape mounting, tape positioning, etc.

These data objects are small enough that when tape cannot begin I/O immediately, any other advantages of utilizing to tape are less significant than completing the storage request as quickly as possible. Also, since these small data objects benefit less by being directed to tape than larger data objects, it is preferred to use DASD rather than storing such data objects on tape before larger data objects.

Whether step 412 leads to step 416 or 418, this next step (416 or 418) may stop after selecting the optimal output media type, in which case another process carries out the storage using the selected output media type. Alternatively, steps 416, 418 may perform additional operations to store the data object, such as issuing storage instructions to the appropriate controller 108, 110, etc.

Storage Criteria-Alternate Expression

As an alternative to the flowchart of FIG. 4, the logical decisions of the sequence 400 appear in tabular form below (TABLE 2).

TABLE 2

LOGICAL DECISIONS OF SEQUENCE 400

| STORAGE REQUEST | | SELECTED OUTPUT MEDIA TYPE | |
|---|---|---|---|
| URGENCY | DATA OBJECT SIZE | TAPE IS PREFERRED IF: | DASD IS PREFERRED IF: |
| URGENT | SMALL | ONLY IF: TAPE IS READY TO CONDUCT I/O, AND QUEUE DOES NOT CONTAIN ANY LARGE OR MEDIUM DATA OBJECTS, OR DASD HAS REACHED ITS MAXIMUM LEVEL OF CONCURRENCY, ONE OR MORE TAPE DRIVES ARE NON-BUSY, AND TAPE BECOMES READY TO CONDUCT I/O BEFORE DASD | PREFERRED, UNLESS SPECIAL CONDITIONS APPLY (SEE LEFT). |
| | MEDIUM | PREFERRED, UNLESS SPECIAL CONDITIONS APPLY (SEE RIGHT). | ONLY IF: ALL TAPES ARE BUSY, OR DASD HAS NOT REACHED ITS MAXIMUM CONCURRENCY, AND NO SMALL DATA OBJECTS ARE QUEUED |
| | LARGE | ALWAYS | NEVER |
| NON-URGENT | ANY | ALWAYS | NEVER |

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for processing requests to store data objects in a data storage system having multiple types of storage output media including direct-access storage constituting a first type and removable tape media constituting a second type, the system including a storage queue containing pending requests to store data objects in the system, the method comprising operations of:
   if the request does not meet prescribed criteria of urgency, selecting the second type of output media;
   if the request meets the prescribed criteria of urgency, selecting output media type according to the data object's size, comprising:
      if the data object's size exceeds a prescribed upper amount, selecting the second type of output media;
      if the data object's size is less than a prescribed lower amount, selecting the first type of output media unless conditions including at least one of the following apply, and under such conditions selecting the second type of output media:
         storage of the second type is substantially immediately ready to conduct input/output and the queue does not contain any data objects of size larger than lower amount;
         the first type of output media is being utilized by a predetermined maximum number of concurrent storage requests, the second type of output media includes one or more non-busy tape drives, and the second type of output media is ready to conduct input/output before the first type of output media;
      if the data object's size is between the first and second prescribed amounts, selecting the second type of output media unless conditions exist including at least one of the following, and under such conditions selecting the first type of output media:
         storage of the second type does not include any non-busy tape drives;
         storage of the first type is being utilized by less than the predetermined maximum number of concurrent storage requests, and the queue does not contain any data objects smaller than the lower amount;
   issuing an output of the selected output media type.

2. The method of claim 1, the operations further comprising:
   issuing instructions to complete the data storage request using the selected type of output media.

3. The method of claim 1, the condition of the storage of the second type being substantially immediately ready to conduct input/output comprising:
   the second type of storage containing an idle tape mounted to an accessible tape drive.

4. The method of claim 1, the second type of output media being ready to conduct input/output before the first type of output media comprising:
   a tape commencing proceeding toward satisfaction of the data storage request by commencing input/output before the DASD commencing such input/output.

5. The method of claim 1, where the second type of output media being ready to conduct input/output before the first type of output media comprising:

a time for the tape to be ready to proceed toward satisfaction of the data storage request by commencing input/output being before a time for DASD to commence such input/output.

6. The method of claim 1, the operations further comprising:

detecting when only one output media type is present in the data storage system, and responsive thereto, selecting the other output media type.

7. The method of claim 1, the prescribed criteria of urgency being met for conditions including at least one of the following: the data storage request being issued synchronously, the data storage request being a wait-type request, the data storage request being a foreground request.

8. The method of claim 1, the operations further comprising, prior to beginning operation of the system, establishing operating parameters including at least one of the following:

the prescribed criteria of urgency, the upper amount, the lower amount.

9. The method of claim 8, the operations further comprising:

the system additionally permitting adjustment of the operating parameters after operation of the system begins.

10. A signal-bearing medium tangibly embodying a program of machine-readable instructions executable by a digital data processing machine to perform operations for processing requests to store data objects in a data storage system having multiple types of storage output media including direct-access storage constituting a first type and removable tape media constituting a second type, the system including a storage queue containing pending requests to store data objects in the system, the operations comprising:

if the request does not meet prescribed criteria of urgency, selecting the second type of output media;

if the request meets the prescribed criteria of urgency, selecting output media type according to the data object's size, comprising:

if the data object's size exceeds a prescribed upper amount, selecting the second type of output media;

if the data object's size is less than a prescribed lower amount, selecting the first type of output media unless conditions including at least one of the following apply, and under such conditions selecting the second type of output media:

storage of the second type is substantially immediately ready to conduct input/output and the queue does not contain any data objects of size larger than lower amount;

the first type of output media is being utilized by a predetermined maximum number of concurrent storage requests, the second type of output media includes one or more non-busy tape drives, and the second type of output media is ready to conduct input/output before the first type of output media;

if the data object's size is between the first and second prescribed amounts, selecting the second type of output media unless conditions exist including at least one of the following, and under such conditions selecting the first type of output media:

storage of the second type does not include any non-busy tape drives;

storage of the first type is being utilized by less than the predetermined maximum number of concurrent storage requests, and the queue does not contain any data objects smaller than the lower amount; and issuing an output of the selected output media type.

11. The medium of claim 10, the operations further comprising:

issuing instructions to complete the data storage request using the selected type of output media.

12. The medium of claim 10, the condition of the storage of the second type being substantially immediately ready to conduct input/output comprising:

the second type of storage containing an idle tape mounted to an accessible tape drive.

13. The medium of claim 10, the second type of output media being ready to conduct input/output before the first type of output media comprising:

a tape commencing proceeding toward satisfaction of the data storage request by commencing input/output before the DASD commencing such input/output.

14. The medium of claim 10, where the second type of output media being ready to conduct input/output before the first type of output media comprising:

a time for the tape to be ready to proceed toward satisfaction of the data storage request by commencing input/output being before a time for DASD to commence such input/output.

15. The medium of claim 10, the operations further comprising:

detecting when only one output media type is present in the data storage system, and responsive thereto, selecting the other output media type.

16. The medium of claim 10, the prescribed criteria of urgency being met for conditions including at least one of the following: the data storage request being issued synchronously, the data storage request being a wait-type request, the data storage request being a foreground request.

17. The medium of claim 10, the operations further comprising, prior to beginning operation of the system, establishing operating parameters including at least one of the following:

the prescribed criteria of urgency, the upper amount, the lower amount.

18. The medium of claim 17, the operations further comprising:

the system additionally permitting adjustment of the operating parameters after operation of the system begins.

19. A logic circuit of multiple interconnected electrically conductive elements configured to perform operations for processing requests to store data objects in a data storage system having multiple types of storage output media including direct-access storage constituting a first type and removable tape media constituting a second type, the system including a storage queue containing pending requests to store data objects in the system, the operations comprising:

if the request does not meet prescribed criteria of urgency, selecting the second type of output media;

if the request meets the prescribed criteria of urgency, selecting output media type according to the data object's size, comprising:

if the data object's size exceeds a prescribed upper amount, selecting the second type of output media;

if the data object's size is less than a prescribed lower amount, selecting the first type of output media unless conditions including at least one of the following apply, and under such conditions selecting the second type of output media:
   storage of the second type is substantially immediately ready to conduct input/output and the queue does not contain any data objects of size larger than lower amount;
   the first type of output media is being utilized by a predetermined maximum number of concurrent storage requests, the second type of output media includes one or more non-busy tape drives, and the second type of output media is ready to conduct input/output before the first type of output media;
if the data object's size is between the first and second prescribed amounts, selecting the second type of output media unless conditions exist including at least one of the following, and under such conditions selecting the first type of output media: storage of the second type does not include any non-busy tape drives; storage of the first type is being utilized by less than the predetermined maximum number of concurrent storage requests, and the queue does not contain any data objects smaller than the lower amount; and
issuing an output of the selected output media type.

20. A data storage system, comprising:

multiple types of storage output media including direct-access storage constituting a first type and removable tape media constituting a second type;

a storage queue containing pending requests to store data objects in the storage media;

a storage manager programmed to perform operations to process requests to store data objects in the storage media, each data object having a size, wherein the operations comprise:
   if the request does not meet prescribed criteria of urgency, selecting the second type of output media;
   if the request meets the prescribed criteria of urgency, selecting output media type according to the data object's size, comprising:
      if the data object's size exceeds a prescribed upper amount, selecting the second type of output media;
      if the data object's size is less than a prescribed lower amount, selecting the first type of output media unless conditions including at least one of the following apply, and under such conditions selecting the second type of output media:
         storage of the second type is substantially immediately ready to conduct input/output and the queue does not contain any data objects of size larger than lower amount;
         the first type of output media is being utilized by a predetermined maximum number of concurrent storage requests, the second type of output media includes one or more non-busy tape drives, and the second type of output media is ready to conduct input/output before the first type of output media;
      if the data object's size is between the first and second prescribed amounts, selecting the second type of output media unless conditions exist including at least one of the following, and under such conditions selecting the first type of output media:
         storage of the second type does not include any non-busy tape drives;
         storage of the first type is being utilized by less than the predetermined maximum number of concurrent storage requests, and the queue does not contain any data objects smaller than the lower amount; and
      issuing an output of the selected output media type.

21. A data storage system, comprising:

multiple types of storage output media including direct-access storage constituting a first type and removable tape media constituting a second type;

queue means for containing pending requests to store data objects in the storage media;

storage managing means for processing requests to store data objects in the storage media, each data object having a size, by:
   if the request does not meet prescribed criteria of urgency, selecting the second type of output media;
   if the request meets the prescribed criteria of urgency, selecting output media type according to the data object's size, comprising:
      if the data object's size exceeds a prescribed upper amount, selecting the second type of output media;
      if the data object's size is less than a prescribed lower amount, selecting the first type of output media unless conditions including at least one of the following apply, and under such conditions selecting the second type of output media:
         storage of the second type is substantially immediately ready to conduct input/output and the queue means does not contain any data objects of size larger than lower amount;
         the first type of output media is being utilized by a predetermined maximum number of concurrent storage requests, the second type of output media includes one or more non-busy tape drives, and the second type of output media is ready to conduct input/output before the first type of output media;
      if the data object's size is between the first and second prescribed amounts, selecting the second type of output media unless conditions exist including at least one of the following, and under such conditions selecting the first type of output media:
         storage of the second type does not include any non-busy tape drives;
         storage of the first type is being utilized by less than the predetermined maximum number of concurrent storage requests, and the queue does not contain any data objects smaller than the lower amount; and
   issuing an output of the selected output media type.

* * * * *